(12) United States Patent
Chang

(10) Patent No.: US 8,817,871 B2
(45) Date of Patent: Aug. 26, 2014

(54) ADAPTIVE SEARCH RANGE METHOD FOR MOTION ESTIMATION AND DISPARITY ESTIMATION

(75) Inventor: Yuan-Teng Chang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 322 days.

(21) Appl. No.: 13/350,811

(22) Filed: Jan. 15, 2012

(65) Prior Publication Data

US 2013/0114689 A1 May 9, 2013

(30) Foreign Application Priority Data

Nov. 3, 2011 (TW) .............................. 100140173 A

(51) Int. Cl.
 H04N 7/26 (2006.01)
 H04N 7/36 (2006.01)
 H04N 7/32 (2006.01)
 H04N 7/50 (2006.01)

(52) U.S. Cl.
 CPC ........... *H04N 19/00678* (2013.01); *H04N 7/26* (2013.01); *H04N 19/00151* (2013.01); *H04N 19/00672* (2013.01); *H04N 19/00769* (2013.01); *H04N 19/00278* (2013.01); *H04N 19/00781* (2013.01)
 USPC ............ 375/240.03; 375/240.12; 375/240.16; 375/240.24

(58) Field of Classification Search
 CPC ........ H04B 1/66; G06T 3/40; H04N 13/0059; H04N 19/00418; H04N 13/0003; H04N 19/0043; H04N 13/0285; H04N 19/002; H04N 19/00157; H04N 19/00363; H04N 19/00357; H04N 19/0026; H04N 19/00369; H04N 19/00169; H04N 19/00206; H04N 19/00066; H04N 19/00266; H04N 19/00175; H04N 19/00315; H04N 19/00757; H04N 19/00903; H04N 19/00781; H04N 19/00278; H04N 19/00351; H04N 19/00321; H04N 19/00896; H04N 21/21805; H04N 19/00769; H04N 21/234327; H04N 21/8451; H04N 19/00763; H04N 19/00151; H04N 19/0069; H04N 19/00024
 USPC ......... 375/240.03, E07.124, 240.02, 240.154, 375/240.23, 240.18, 240.19, E07.126; 348/43, E13.062
 See application file for complete search history.

(56) References Cited

U.S. PATENT DOCUMENTS 6,043,838 A * 3/2000 Chen .............................. 348/42
7,609,765 B2 * 10/2009 Li .............................. 375/240.16

(Continued)

FOREIGN PATENT DOCUMENTS

CN 1791224 6/2006
TW I295142 3/2008

OTHER PUBLICATIONS

Adaptive Multiview Video Coding Scheme Based on Spatiotemporal Correlation Analyses by, Yun Zhang, Gang Yi Jiang, Mei Yu, and Yo Sung Ho; ETRI Journal, vol. 31, No. 2, Apr. 2009.*

(Continued)

*Primary Examiner* — Dave Czekaj
*Assistant Examiner* — Dramos I Kalapodas
(74) *Attorney, Agent, or Firm* — Jianq Chyun IP Office

(57) ABSTRACT

An adaptive search range method for motion/disparity estimation is provided in multi-view video coding (MVC) technology. The method uses a initial search range as a first search range, perform an estimation flow for first blocks in a first frame to obtain vector distribution, and obtain at least a first candidate search range in accordance with the vector distribution. The first candidate search range is selected as a second search range to perform estimation flow for second blocks in a second frame, and an estimation vector according to the estimation flow is obtained and provided as video coding.

10 Claims, 15 Drawing Sheets

(56) References Cited

U.S. PATENT DOCUMENTS

| | | | |
|---|---|---|---|
| 7,852,940 | B2 | 12/2010 | Malayath |
| 8,165,201 | B2* | 4/2012 | Ho et al. .................. 375/240.02 |
| 2005/0031035 | A1* | 2/2005 | Vedula et al. ............ 375/240.12 |
| 2005/0238102 | A1* | 10/2005 | Lee et al. ................. 375/240.16 |
| 2007/0237232 | A1 | 10/2007 | Chang et al. |
| 2008/0112481 | A1* | 5/2008 | Hsaing et al. ............ 375/240.03 |
| 2009/0225834 | A1* | 9/2009 | Song et al. ............... 375/240.12 |
| 2011/0090964 | A1* | 4/2011 | Xu et al. .................. 375/240.16 |
| 2011/0286525 | A1* | 11/2011 | Kamisli et al. ........... 375/240.16 |
| 2012/0033040 | A1* | 2/2012 | Pahalawatta et al. ........... 348/43 |
| 2012/0320986 | A1* | 12/2012 | Shimizu et al. .......... 375/240.16 |

OTHER PUBLICATIONS

Motion Compensated and Disparity Compensated Prediction Techniques for Video Coding by, Wong Ka Man, Aug. 2011, Submitted to Department of Electronic Engineering in Partial Fulfillment of the Requirements for the Degree of Doctor of Philosophy; City University of Hong Kong.*

"Advanced Video Coding for Generic Audiovisual Services", Joint Video Team (JVT) of ISO/IEC MPEG and ITU-T VCEG, Mar. 2010.

Ding et al., "Content-Aware Prediction AlgorithmWith Inter-View Mode Decision for Multiview Video Coding", IEEE Transactions on Multimedia, Vol. 10, No. 8, Dec. 2008, pp. 1553-1564.

Shen et al, "View-Adaptive Motion Estimation and Disparity Estimation for Low Complexity Multiview Video Coding", IEEE Transactions on Circuits and Systems for Video Technology, vol. 20, No. 6, Jun. 2010, pp. 925-930.

Zhu et al., "Fast Inter Mode Decision Based on Textural Segmentation and Correlations for Multiview Video Coding", IEEE Transactions on Consumer Electronics, vol. 56, No. 3, Aug. 2010, pp. 1696-1704.

Lin et al., "A Fast Direction Predictor of Inter Frame Prediction for Multi-View Video Coding", Circuits and Systems, 2009. ISCAS 2009. IEEE International Symposium, May 24-27, 2009, pp. 2589-2592.

* cited by examiner

FIG. 4E

ADAPTIVE SEARCH RANGE METHOD FOR MOTION ESTIMATION AND DISPARITY ESTIMATION

CROSS-REFERENCE TO RELATED APPLICATION

This application claims the priority benefit of Taiwan application serial no. 100140173, filed on Nov. 3, 2011. The entirety of the above-mentioned patent application is hereby incorporated by reference herein and made a part of this specification.

BACKGROUND OF THE DISCLOSURE

1. Field of the Disclosure

The disclosure relates to an adaptive search range method for motion/disparity estimation relevant to multiview video coding (MVC) technology.

2. Description of Related Art

Muitiview video is a plurality of images acquired by a plurality of cameras taking images of a same target object and background. Multiview video can provide users with a sense of complete perception by transmitting several views of the target object captured at different angles to the receivers simultaneously. It can also give users vivid information about the scene structure. Moreover, it can provide the capability of 3-D perception by respectively showing two of these frames to the eyes. Multiview video has been widely adopted in various applications, such as 3-D blue-ray disc player, 3-D camcorder, internet protocol television (IPTV), and so on.

Multiview video utilizes the technique of taking images of a same target object and background by multiple cameras. When the number of the captured views is increased, a huge amount of image data will be generated by the multiple cameras. Therefore, how to efficiently code and transmit such huge amount of image data has become an important issue. As a result, multiview video coding (MVC) is developed as an extension profile of H.264/AVC ("Advanced Video Coding for Generic Audiovisual Services," Joint Video Team of ISO/IEC MPEG and ITU-T VCEG, March 2010), and widely adopted in various applications.

Multiview video is highly related to time vector, and such relation is used to improve coding efficiency. On the other hand, in the dynamic image of the multiview video, when all the cameras are synchronized, the images taken at the same time by each of the camera have high correlations because such images are obtained by taking images of a target object and background having the same condition from different positions. In multiview video coding, the aforementioned correlation can be used to improve coding efficiency.

SUMMARY OF THE DISCLOSURE

The disclosure provides an adaptive search range method for motion/disparity estimation relevant to multiview video coding (MVC) technology.

One of the embodiments provides an adaptive search range method for motion estimation adapted to MVC. The adaptive search range method for motion estimation provides to use an initial search range set as a first search range to perform a motion estimation flow for a plurality of the first blocks of a first frame obtained from a first view and obtain a motion vector distribution, and accordingly select a first candidate search range based on the motion vector distribution. In addition, select the first candidate search range or the initial search range as a second search range for performing motion estimation flow for a plurality of the second blocks in a second frame. A motion vector of the second block is obtained and provided to the second frame for video coding, wherein the second frame comes from the second view.

In an embodiment, the method to select the first candidate search range in the aforementioned adaptive search range method for motion estimation includes to divide the initial search range into multiple regions, wherein each region has a corresponding counter value. Among the aforementioned first blocks, determine within which region each motion vector of the first block locates, and accordingly increase the corresponding counter value of the region. After the analysis of which region the motion vector of the first block locates within is completed, select a best search range ($SR_{best}$) from a corresponding region with the highest counter value according to the motion vector distribution. Calculate the first candidate search range according to the best search range ($SR_{best}$), the initial search range and the number of the regions. For example, an embodiment provides to set the first candidate search range as a sum of the best search range ($SR_{best}$) plus the quotient of dividing the initial search range by the number of the regions.

In an embodiment, the aforementioned adaptive search range method for motion estimation provides to select the first candidate search range or the initial search range as the second search range, wherein the method for selecting the initial search range as the second search range includes obtaining neighboring block information according to the multiple neighboring blocks of the second block. Analyze whether the second block conforms to a motion characteristic judgment method according to the neighboring block information. If affirmative, the second search range selects the initial search range as the second search range. If negative, the second search range selects the first candidate search range.

One of the embodiments provides an adaptive search range method for disparity estimation adapted to MVC. The adaptive search range method for disparity estimation includes to use an initial search range set as a first search range to perform a disparity estimation flow for a plurality of first blocks in a first frame, and obtain a disparity vector distribution, wherein the first frame is obtained at a first time. A first candidate search range and a second candidate search range are obtained according to the disparity vector distribution. Select the first candidate search range or the second candidate search range as the second search range to perform the disparity estimation flow for the multiple second blocks in the second frame. A disparity vector corresponding to the disparity estimation flow is obtained and used as video coding. Note that the second frame is obtained at a second time, and the first time is earlier than the second time.

In an embodiment, the aforementioned adaptive search range method for disparity estimation provides: the second search range is selected from the first candidate search range, the second candidate search range or the initial search range. Moreover, the method of selection for the second search range includes to obtain neighboring block information according to the multiple neighboring blocks of the second block. Analyze whether the second block conforms to a disparity characteristic judgment method according to the neighboring block information. If affirmative, the second search range selects the initial search range as the second search range. If negative, the second search range selects either the first candidate search range or the second candidate search range.

In an embodiment, the aforementioned adaptive search range method for disparity estimation provides that the method for determining whether the second block conforms to the disparity characteristic judgment method according to the neighboring block information includes to determine whether none of the disparity vectors of the neighboring blocks is selected. If affirmative, the second search range selects the second candidate search range. In addition, analyze whether the disparity vector of the neighboring blocks locates out of a best search range ($SR_{best}$), and whether none of the disparity vector of the neighboring blocks is selected. If both are affirmative, the second search range selects the inital search range. If either is negative, the second search range selects the first candidate search range.

Several exemplary embodiments accompanied with figures are described in detail below to further describe the disclosure in details.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

FIGS. 4A-4E are schematic views illustrating the adaptive search range method for motion estimation (ME) of one of the embodiments of the disclosure.

DESCRIPTION OF EMBODIMENTS

The disclosure provides an adaptive search range method for motion estimation and/or disparity estimation relevant to multi-view video coding (MVC) technology.

The structure of the H.246/AVC standard is used here to explain the coding process of the MVC technology.

The coding process of the H.246 standard utilizes the technique of motion compensation, transform, quantization, and entropy coding to the inputted image data to conduct high-efficiency coding.

The motion compensation of H.246 divides the frame of the coding target into different sizes of macroblock. The exemplary seven sizes include: 16*16 (pixels), 16*8, 8*16, 8*8, 8*4, 4*8 and 4*4. The macroblock can predict and estimate images so as to accomplish high-efficiency coding by using tiny units corresponding to the difference of the direction and degree of motion of the target object to be pictured.

The aforementioned image prediction technique includes intra-picture (within a same picture) prediction and inter-picture (among multiple pictures) prediction. Intra-picture prediction considers spatial factors. That is, prediction is conducted based on the correlation between the neighboring blocks of a same picture. Inter-picture prediction is based on the time axis, and uses the earlier or the later pictures as reference picture. Take inter-picture prediction for example, image prediction is conducted by selecting a so-called reference frame, which is a frame done coding, among each macroblock, and by using the motion vector or the vector information of the corresponding points thereof.

For multiview video coding, besides exploiting the correlation of images in the time orientation, the correlation of images captured by the different cameras at the same time may also be exploited. Therefore, in addition to the motion compensation, multiview image can be coded by performing the disparity compensation of the pictures taken at the same time by different cameras. Here, disparity refers to the difference of the projection image on the image surface of the cameras in different positions, of a to-be-pictured object. Disparity compensation predicts each pixel of the object frame to be coded based on the above correlation, and code the prediction residual and the disparity information representing the correlation.

Figure 1:
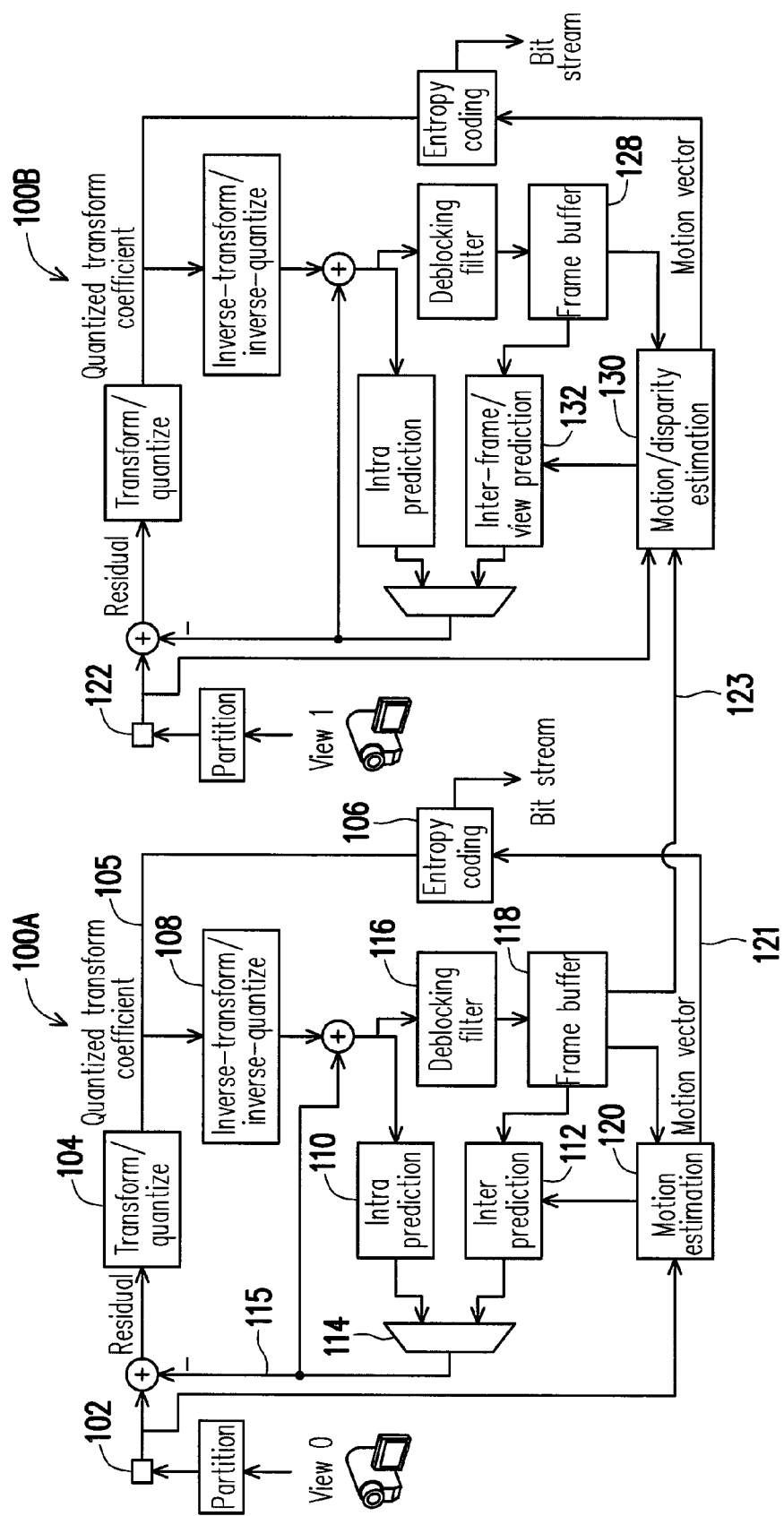
FIG. 1 is a schematic view of the structure and coding flow of the multiview video coding (MVC) technology conforming to the H.264/AVC standard.

FIG. 1 is a schematic view of the structure and coding flow of the multiview video coding (MVC) technology conforming to the H.246/AVC standard. In FIG. 1, index 100A is a process to code the video image data obtained from a first view. Index 100B is a process to code the video image data obtained from the second view.

Here is an explanation of the process 100A, which is the process of coding directed to the first view. Regarding the frame data 102 obtained from the first view, divide the frame to be coded into different sizes of macroblocks for inputting. After conducting the transform/quantize process 104 to the residual obtained by executing the motion compensation to the frame data 102 and obtaining the quantized transform coefficient, the coded bit stream is generated by the entropy coding process 106.

Here is an explanation of the calculation process of the aforementioned motion compensation.

After encoding a macroblock, the encoder decodes it to provide a reference for further predictions. The coefficients are inverse quantized and inverse transformed by the process 108. Furthermore, after the inverse-transform/inverse-quantization process 108, the deblocking filter 116 is applied to smooth the block edges and the filtered image is stored in the frame buffer 118 for motion-compensated prediction. The intra-picture prediction process 110 is performed according to the current block 102 and previously encoded blocks. The motion estimation process 120 executes motion estimation according to the formerly coded reference frame recorded in the frame buffer 118 and the inputted frame data 102. Inter-picture prediction process 112 is executed based on the result estimated from the motion estimation process 120. From the intra-picture prediction process 110 and the inter-picture prediction process 112, selection is conducted by the multiplexer 114 to be used as a basis for executing motion compensation to the subsequent macroblock of the inputted frame data 102. Simultaneously, the motion vector 121 created by the motion estimation process 120 is also provided to the entropy coding process 106 for coding.

The coding process 100B executed in the second view is similar to the coding process in the first view. The difference between the two is that in addition to the inputted frame data 122 and the formerly coded reference frame recorded in the frame buffer 128, the process 130 further obtains the stored reference frame from the frame buffer 118 of the first view, and executes motion estimation and disparity estimation based on the data obtained. Further, the inter-picture prediction process 132 further uses the multiple frames obtained from a same view and other multiple frames obtained from other views to conduct prediction.

The basic technology of MVC conforming to the H.246/AVC standard is to obtain and exploit not only the temporal redundancy information that exists between the frames within one given view but also use the similarities of the frames obtained from other views to improve coding efficiency. Accordingly, comparing to the process of independent coding of each view, such structure can reduce about 20% to 30% of bit rate without sacrificing the reconstructed video quality.

Figure 2:
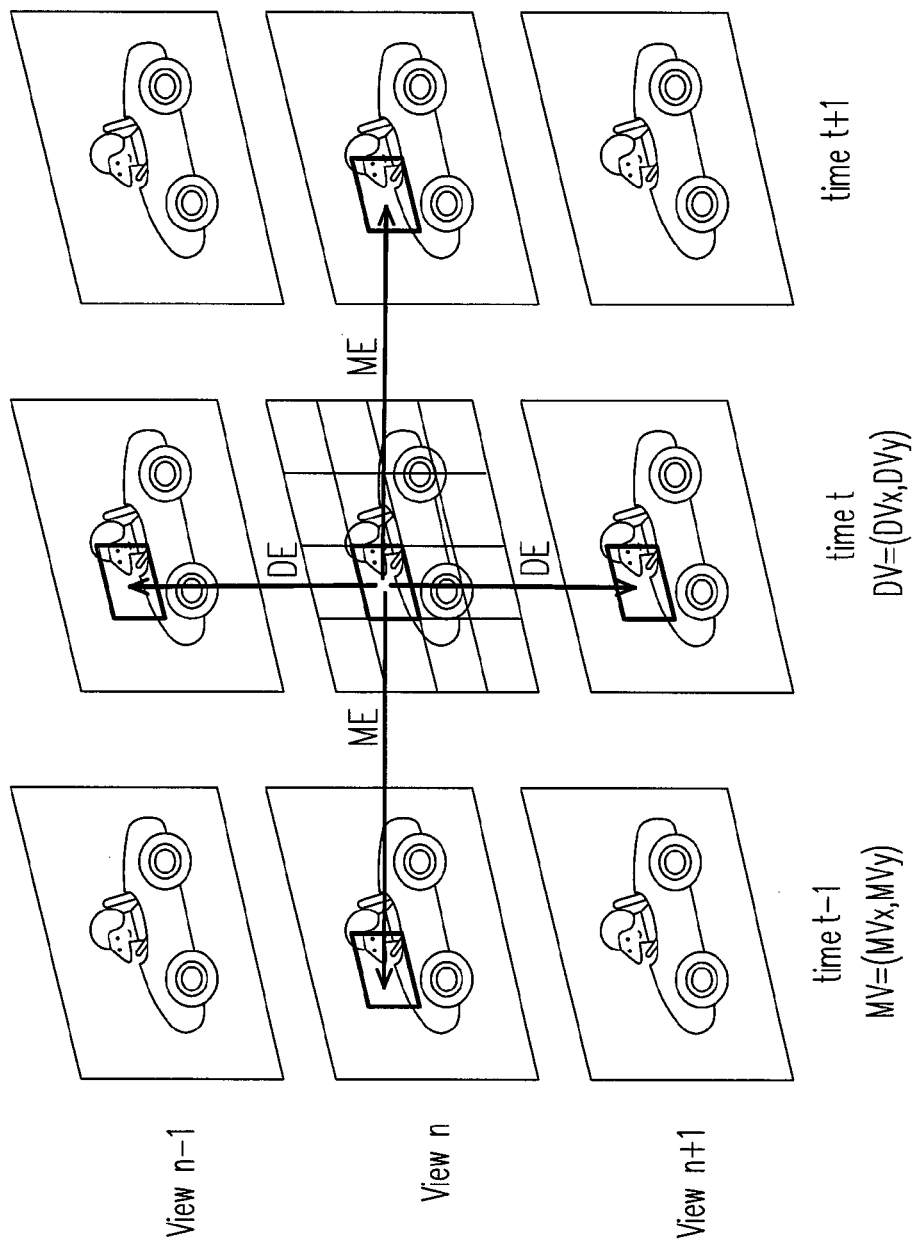
FIG. 2 is a schematic view illustrating performing motion estimation to different frames during a continuous time, and performing disparity estimation to the continuous views.

Generally, motion estimation (hereinafter "ME") is used to find the best matching block between continuous frames so as to reduce the temporal redundancy between the frames. On the other hand, disparity estimation (hereinafter "DE") is used to find the best matching block between continuous views so as to reduce the redundancy between the views. Referring to FIG. 2, which is a schematic view illustrating conducting ME toward different frames at continuous times, and conducting DE toward continuous views between continuous views. Between the frames respectively obtained at time t−1, t and t+1, ME process can be performed to reduce the temporal redundancy between the images. In addition, at time t, DE process can be performed to the frames respectively obtained at view n−1, n, and n+1, to reduce the view redundancy between the images.

Figure 3A:
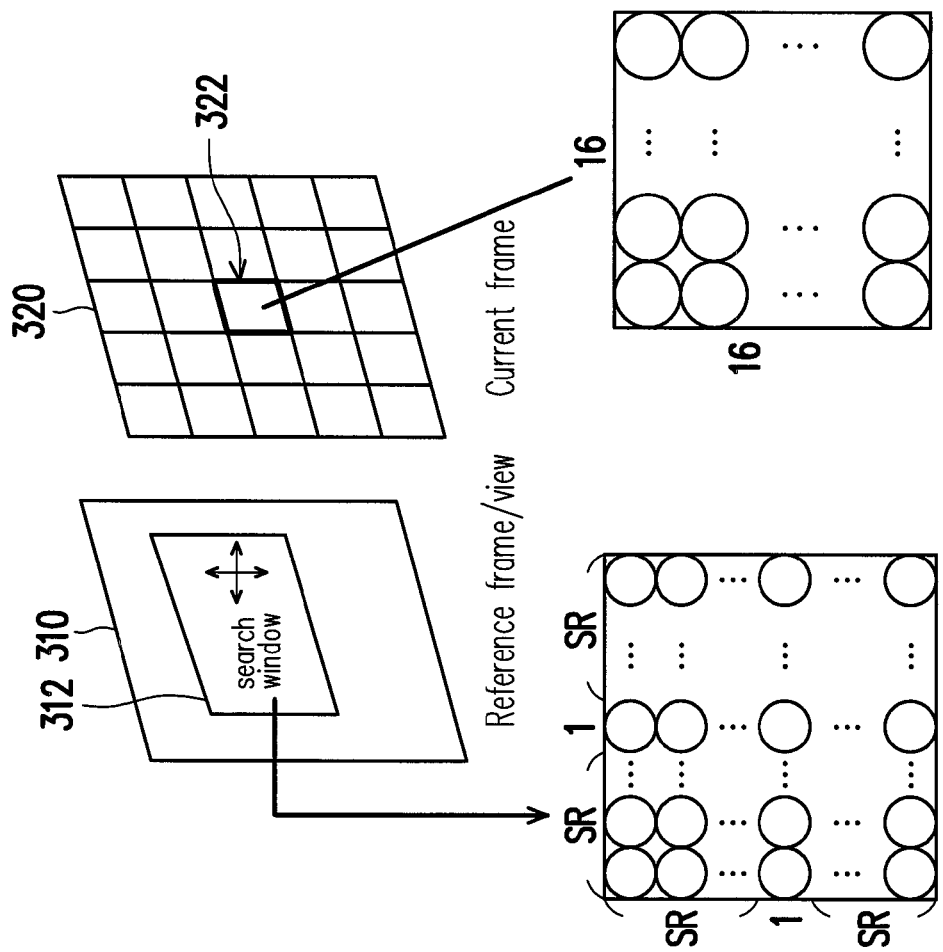
FIG. 3A is a schematic view of conducting search window according to search range (SR), and performing motion estimation or disparity estimation in the search window of the previous reference frames or frames of other views.

However, compared with single-view encoding process, the additional DE process will cause the MVC device to comsume more copmuting resource. The aforementioned condition will be explained by FIGS. 3A and 3B. First, FIG. 3A illustrates an embodiment of performing estimation within a search window 312 which size is determined by search range (SR) in a prior reference frame or view 310. Frame 320 includes multiple macroblock (MB), and uses macroblock, for example, index 322, to conduct ME and DE.

Figure 3B:
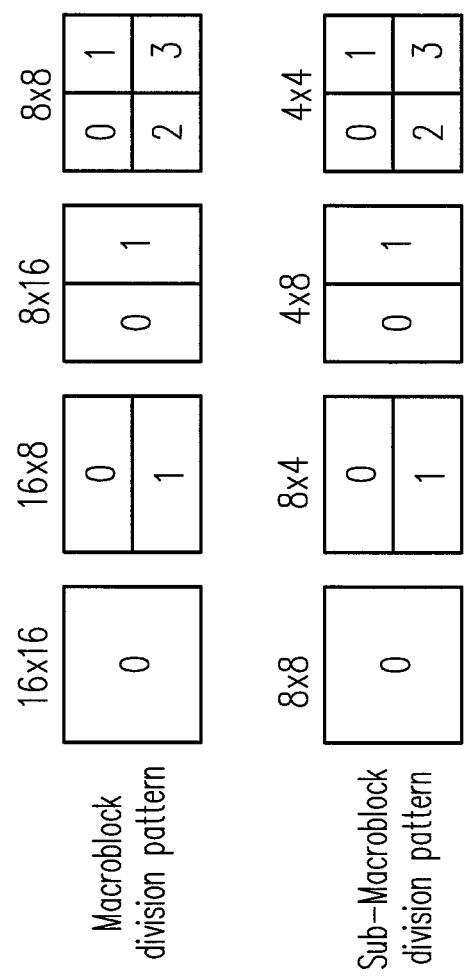
FIG. 3B is a schematic view illustrating the division patterns of the macroblock and the sub-macroblock.

The ME and DE are performed toward each block to respectively find the best motion vector and the best disparity vector. In an embodiment, the size of the aforementioned blocks may be the macroblock division pattern of 16×16, 16×8, 8×16 and 8×8, or the the sub-macroblock division pattern of 8×8, 8×4, 4×8 and 4×4, as shown in FIG. 3B.

After performing the ME process and the DE process to each divided blocks, either motion vector or disparity vector is selected according to the rate-distortion cost principle. The rate-distortion cost principle is as follows.

$$\lambda \times Rate(mvd) + SAD \quad \text{(Equation 1) or}$$

$$\lambda \times Rate(mvd) + SATD \quad \text{(Equation 2)}$$

$\lambda$ is a Lagrange parameter. SAD represents the sum of absolute differences. SATD represents the sum of absolute transformed difference. Rate(mvd) represents the bit rate of the motion vector difference.

Not all the points in the reference frame are searched in the process of performing ME and DE. Instead, only the search points within a limited search window are searched. In addition, the size of the window is determined by $(2 \times SR+1)^2$. Referring to FIG. 3A, the SR represents the search range. According to the above, the time required to perform the ME process and the DE process by applying the full-search algorithm is controlled by SR, and such time is in direct ratio with the square value of SR.

Nowadays, high-resolution video (HD video), for example, the HD1080p has become more and more popular. Such HD video requires broader SR to perform the ME process and the DE process to achieve better coding quality. However, broader search range leads to longer execution time. For example, if the search range is set as sixty-four, the ME process and the DE process will account for about 60% to 80% of coding time. Therefore, the disclosure provides a method for effectively reducing the computation time of ME and DE, so as to achieve the real-time coding need for multiview video data.

The disclosure provides an adaptive search range method for ME and/or DE in MVC technology, and a video coding device using such method thereof.

One of the embodiments provides an adaptive search range method for ME. The method determines the size of the adaptive search range according to the motion vector distribution (MV distribution) obtained at the base view selected. Another embodiment provides an adaptive search range method for DE. The method determines the size of the adaptive search range according to the disparity vector distribution (DV distribution) of the multiple previous frames.

The aforementioned adaptive search range method for ME and DE may effectively reduce the time for performing ME and DE. Take the MVC that is compatible with H.246/AVC multiview high profile as an example, the requirement for real-time coding can be achieved for the 2-view HD 1080p 30 fps video sequences without sacrificing coding quality.

Embodiments of the Adaptive Search Range Method for Motion Estimation.

FIGS. 4A-4D discloses one of the embodiments of the disclosure, and explains the adaptive search range method for ME.

Figure 4A:
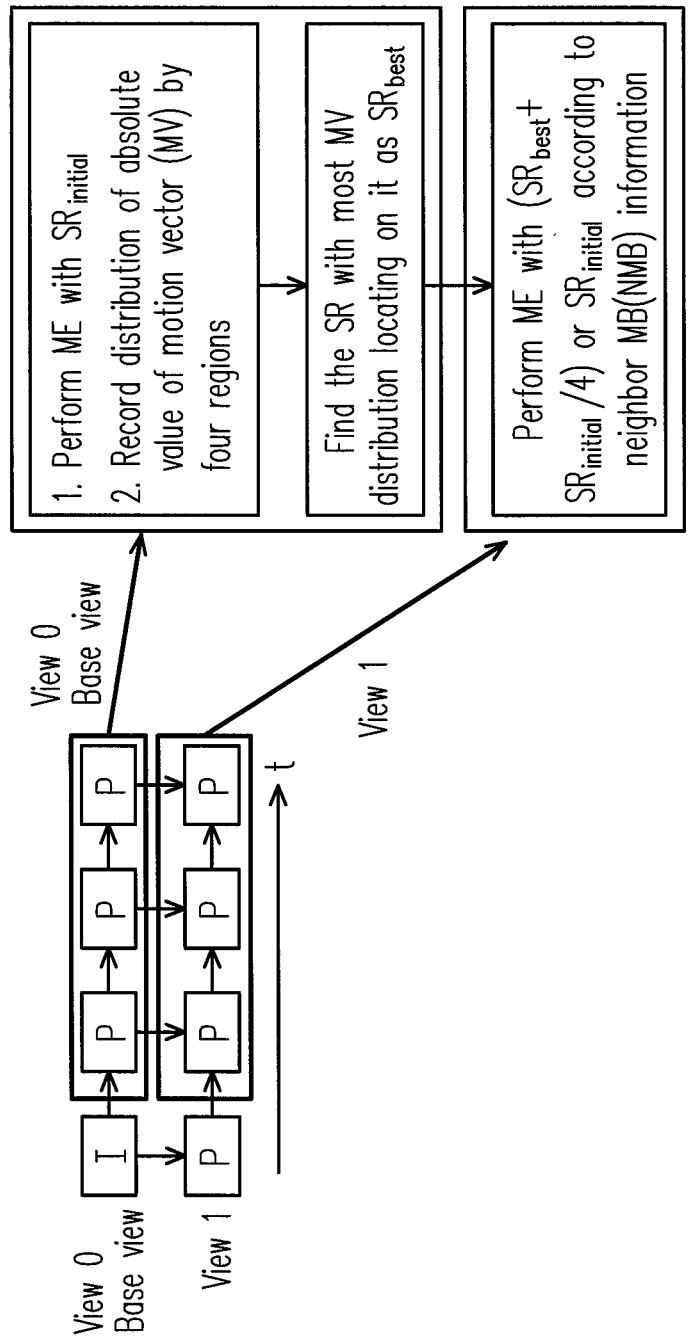

Referring to FIG. 4A, in the embodiment, first perform ME with $SR_{initial}$ to each macroblock (MB) of the base view. The base view may, by selection, be "view 0". Whenever the ME of a macroblock is completed, the absolute value of the motion vector is obtained and the interval range of motion vector distribution of such motion vector is recorded. In this embodiment, four regions are used to record the distribution, but the number of the regions is not limited thereof.

After finishing performing ME to all the macroblocks of the base view, the search range (SR) with the most motion vector (MV) distribution is selected as the best search range ($SR_{best}$). The best search range ($SR_{best}$) will be selected by a non-base view as a search range for performing ME, that is, the candidate search range.

As for the frame of the non-base view, for example, a P frame in view 1 as in FIG. 4A, candidate search range SR will be calculated according to the best search range $SR_{best}$, the initial search range $SR_{initial}$ and the number of the regions. For example, the candidate search range is the sum of the best search range $SR_{best}$ plus interval range $SR_{initial}/4$ if the four regions are employed. That is, the candidate search range is $SR=SR_{best}+SR_{initial}/4$. Still, in specific circumstances, the frame of the non-base view will extend the search range to the initial search range ($SR_{initial}$). For example, the aforementioned circumstances are determined based on the information of the neighboring macroblock (NMB). When it is determined that the macroblock (MB) being handled has a high-motion characteristic based on the information of the neighboring macroblock (NMB), the search range extends to the initial search range ($SR_{initial}$).

Figure 4B:
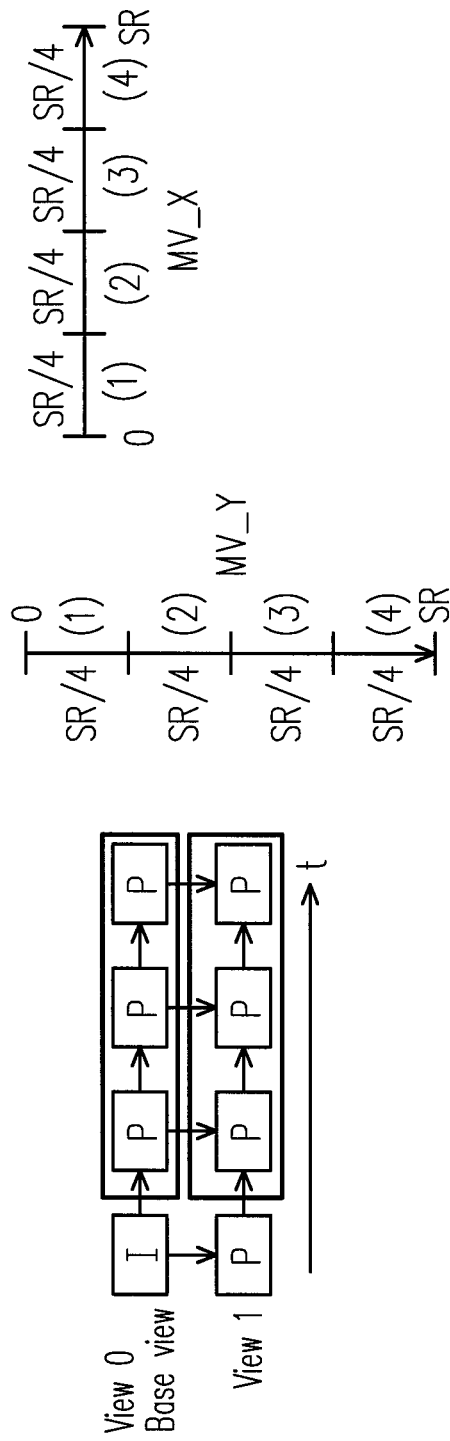

Referring to the upper right hand side of FIG. 4B, the record and statistics of the motion vector distribution must be divided into vertical motion vector distribution and horizontal motion vector distribution. That is, vertical motion vector and horizontal motion vector must be handled separately. In addition, search range of the vertical motion vector or the horizontal motion vector can be adjusted respectively.

In the embodiment, four regions are used for recording distribution of the horizontal motion vector (MV_X) distribution and the vertical motion vector (MV_Y) distribution. The four regions are region(1), region(2), region(3) and region(4), respectively. The value of the corresponding search range (SR) is determined according to the four regions. For example, each interval range is SR/4, which may be adjusted according to the distribution.

Take initial search range ($SR_{initial}$) as thirty-two as an example for explanation, region(1), region(2), region(3) and region(4) are used for gathering motion vector distribution. The location interval ranges of the absolute value of horizontal motion vector (MV_X) distribution or the vertical motion vector (MV_Y) are 0-7, 8-15, 16-23 and 24-31. The counter values of the distribution are counter_1, counter_2, counter_3 and counter_4.

Figure 4C:
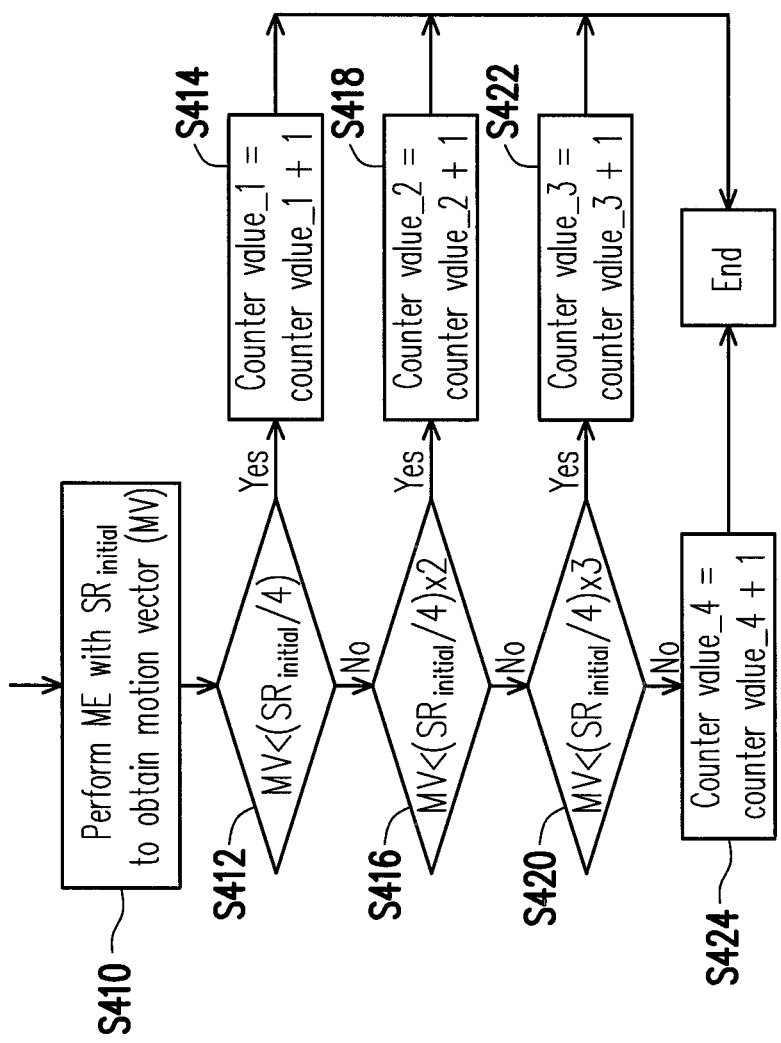

FIG. 4C is a flow chart that illustrates performing distribution calculation to all the motion vectors (MV) obtained from the motion estimation of all the macroblocks (MB) of the base view in this embodiment. In step S410, the motion vector of all the macroblocks is obtained by performing motion estimation to all the macroblocks of the base view with the initial search range ($SR_{initial}$). Then, according to step S412, determine whether the motion vector is smaller than ¼ of the initial search range ($SR_{initial}$); if affirmative, increase the value of the counter_1 by one as in step S414, and end this distribution calculation process; if negative, execute the next step. In step S416, determine whether the motion vector is smaller than ²⁄₄ of the initial search range ($SR_{initial}$); if affirmative, increase the value of the counter_2 by one as in step S418, and end this distribution calculation process; if negative, execute the next step. In step S420, determine whether the motion vector is smaller than ¾ of the initial search range ($SR_{initial}$); if affirmative, increase the value of the counter_3 by one, and end this distribution calculation process; if negative, increase the value of the counter_4 by one, and end this distribution calculation process.

Figure 4D:
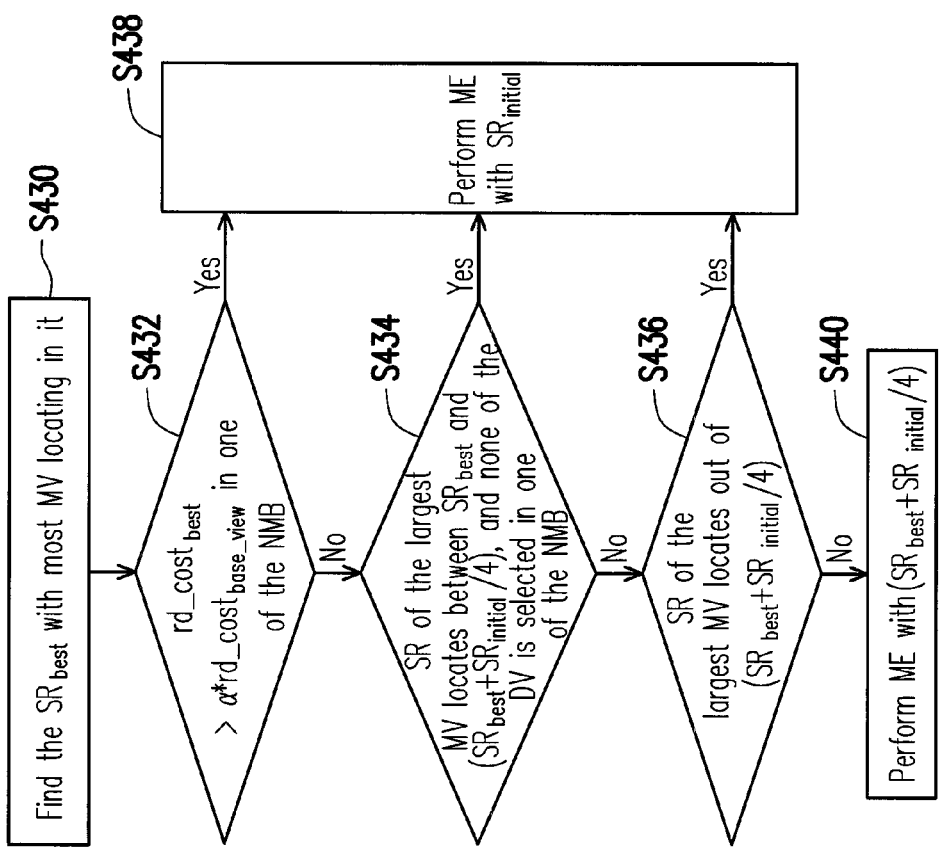
Figure 4E:
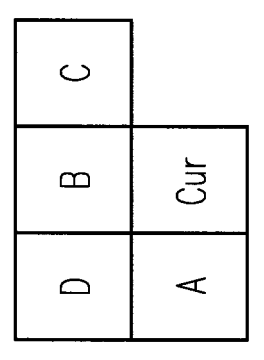

FIGS. 4D and 4E are flow charts illustrating the determination process of the search range used during performing ME to the macroblock (MB) of the non-base view in an embodiment.

When performing ME to the macroblock of the non-base view, the search range used may be one of the two candidate search ranges, which include the aforementioned the best search range $SR_{best}$ plus interval range $SR_{initial}/4$, or extend the search range to the initial search range ($SR_{initial}$). The determination process is illustrated in the embodiment in FIG. 4D.

Generally, the selected search range is the best search range ($SR_{best}$) plus interval range $SR_{initial}/4$, i.e., (SR=$SR_{best}$+$SR_{initial}/4$). However, if it is determined that the macroblock (MB) being handled has high-motion characteristic according to the neighboring macroblock (NMB) information, to avoid missing the correct motion vector and dropping the coding quality, the aforementioned high-motion characteristic of the neighboring macroblock (NMB) being handled must be included when selecting the search range.

One of the embodiments of the disclosure provides three rules for expanding the search range to the initial search range ($SR_{initial}$) when performing ME to the macroblock of the non-base view. It is to be noted that the rules are not limited herein.

Referring to FIG. 4D, step S430 provides to select the search range with the most motion vectors (MV) in the distribution region as the best search range ($SR_{best}$).

Rule 1, as in step S432, determine whether the rate-distortion cost (hereinafter "$rd\_cost_{best}$") of any of the neighboring macroblock (NMB) of the macroblock (MB) currently being performed with ME is α times higher than the average rate-distortion cost (hereinafter "$rd\_cost_{base-view}$") of each macroblock (MB) of the base view. Rule 1 can be paraphrased as follows:

$$rd\_cost_{best} > \alpha \times rd\_cost_{base-view} \qquad \text{(Equation 3)}$$

In some embodiments, the recommended value for α is 1.75.

Rule 2, as in step S434, determine whether the maximum motion vector of any neighboring macroblock (NMB) locates between $SR_{best}$ and ($SR_{best}$+$SR_{initial}/4$), and none of the neighboring macroblock (NMB) selects disparity vector (DV).

Rule 3, as in step S436, determine whether the maximum motion vector of any neighboring macroblock (NMB) locates out of ($SR_{best}$+$SR_{initial}/4$).

If any of the rules in steps S432-436 is fulfilled, expand the search range to the initial search range ($SR_{initial}$) when performing ME to the macroblock of the non-base view, as in step S438. On the other hand, if none of the rule in steps S432-436 is fulfilled, maintain the best search range ($SR_{best}$) plus interval range $SR_{initial}/4$, i.e., (SR=$SR_{best}$+$SR_{initial}/4$), as the search range.

Referring to the embodiment disclosed in FIG. 4E, regarding the neighboring macroblock (NMB) of the macroblock (MB) currently being handled, the index "Cur" represents the macroblock currently being handled. The macroblock of index "A", "B", "C" and "D" may represent the neighboring macroblock.

Figure 5:
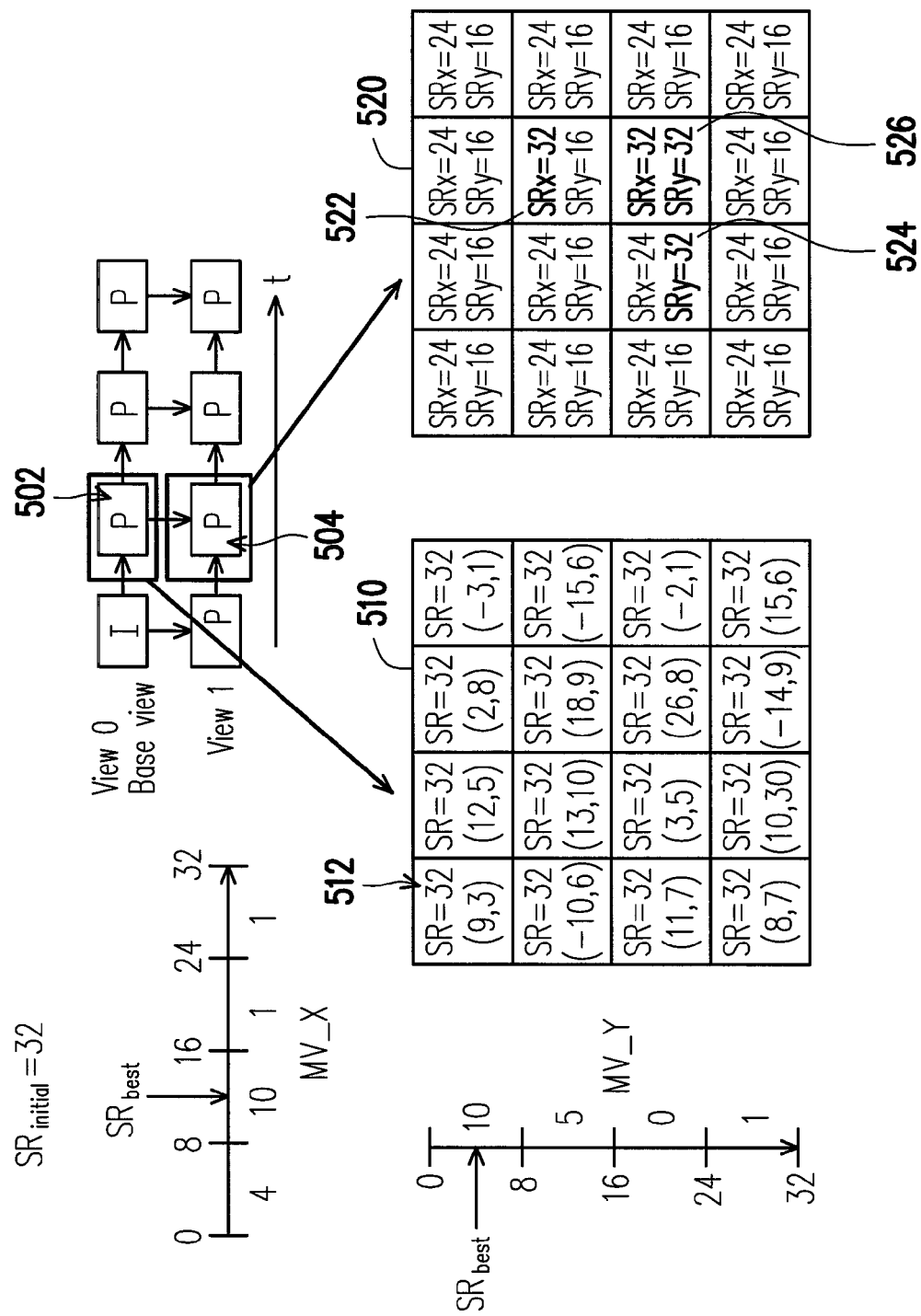
FIG. 5 is a schematic view of the adaptive search range method for motion estimation (ME) disclosed in an exemplary embodiment of the disclosure.

FIG. 5 is a schematic view of the adaptive search range method for motion estimation (ME) disclosed in an exemplary embodiment of the disclosure. Here, the initial search range ($SR_{initial}$) is set to be thirty-two for exemplary explanation.

Perform ME with the initial search range ($SR_{initial}$) to the macroblock (MB) in the search window, according to the frame obtained from the base view. Such frame from the base view may be, for example, the P frame (502) obtained from view 0 as base view. Therefore, all the macroblocks (MB) use SR=32 and obtain horizontal motion vector (MV_X) distribution and vertical motion vector (MV_Y) distribution.

Perform ME with initial search range ($SR_{initial}$) to each macroblock. Whenever the ME of a macroblock is completed, the absolute value of the motion vector is obtained and the interval range of motion vector distribution of such motion vector is recorded. For example, after completing the ME of the macroblock 512, (MV_X, MV_Y)=(9, 3) is obtained. Because MV_X=9 is larger than seven and smaller than fifteen, the MV_X locates in the second region, and therefore one is added to the corresponding counter value. Referring to FIG. 5, after performing ME with initial search range (SR=32) to all macroblocks of the P frame (502) obtained from view 0 (the base view), the $SR_{best}$(MV_X) obtained is between eight and fifteen, and the $SR_{best}$(MV_Y) is between zero and seven.

Regarding the macroblock of the non-base view, take the P frame (504) at view 1 for example, the search range will be the best search range ($SR_{best}$) plus interval range $SR_{initial}/4$, i.e., (SR=$SR_{best}$+$SR_{initial}/4$). In this example, the horizontal $SR_{best}$ will be twenty-four and the vertical $SR_{best}$ will be sixteen.

In specific circumstances, the search range will be expanded to the initial search range ($SR_{initial}$). For example, because the macroblocks indexed 522, 524 and 526 conforms to one of the three rules as disclosed in FIG. 4D, such macroblocks 522, 524 and 526 have high-motion characteristic, and therefore the search range will be expanded to the initial search range (SR=32).

Embodiments of the Adaptive Search Range Method for Disparity Estimation.

FIGS. 6A-6D explains one of the embodiments of the adaptive search range method for DE disclosed in the disclosure of the MVC technology. The adaptive search range method for DE selects the disparity vector distribution (DV distribution) of several previous frames and accordingly determines the size of the adaptive search range.

Figure 6A:
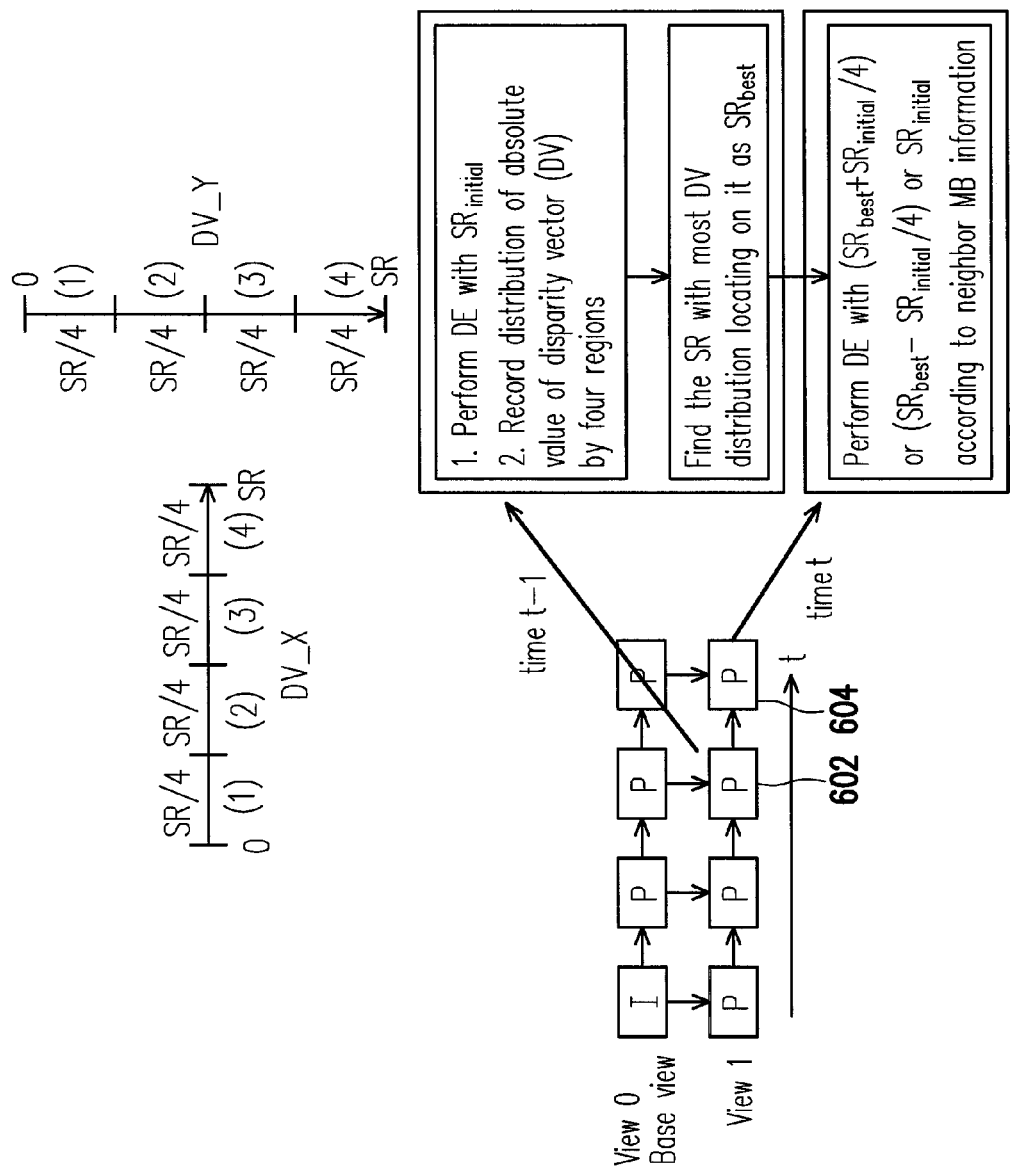
FIGS. 6A-6D are schematic views illustrating the adaptive search range method for disparity estimation (DE) in MVC technology, according to an exemplary embodiment of the disclosure.

In the embodiment in FIG. 6A, referring to the time axis, first perform DE with initial search range ($SR_{initial}$) to every macroblock (MB) in a first P frame (for example, frame 602 in FIG. 6A). Whenever the DE of a macroblock is completed, the absolute value of the disparity vector (DV) is obtained and the interval range of disparity vector distribution of such disparity vector is recorded. In this embodiment, four regions are used to record the distribution, but the number of the regions is not limited thereof.

After completing performing DE to all the macroblocks in the first P frame, the search range (SR) with the most disparity vector (DV) distribution is selected as the best search range ($SR_{best}$). The best search range ($SR_{best}$) will be selected as the search range for the next frame to start performing DE. An example of the next frame is the second P frame (frame 604 in FIG. 6A).

Regarding the second P frame (frame 604 in FIG. 6A), the search range (SR) is the best search range ($SR_{best}$) plus or minus the interval range $SR_{initial}/4$, i.e., SR=$SR_{best}$+$SR_{initial}/4$ or SR=$SR_{best}$−$SR_{initial}/4$. In specific circumstances, the second P frame (frame 604 in FIG. 6A) will expand the search range to the initial search range ($SR_{initial}$). The aforementioned expansion of the search range is determined according to the neighboring macroblock (NMB) information.

Figure 6B:
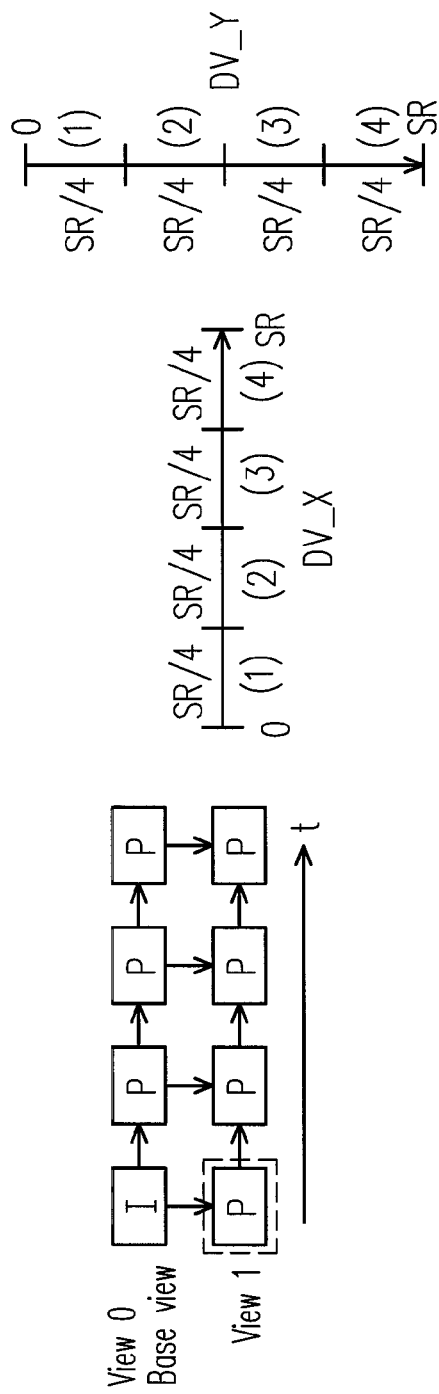

Referring to the upper right hand side of FIG. 6B, the record and statistics of the disparity vector distribution must be divided into vertical disparity vector distribution and horizontal disparity vector distribution. That is, vertical disparity vector and horizontal disparity vector must be handled separately. In addition, search range of the vertical disparity vector or the horizontal disparity vector can be adjusted respectively.

In the embodiment, four regions are used for recording distribution of the horizontal disparity vector (DV_X) distribution and the vertical disparity vector (DV_Y) distribution. The four regions are region(1), region(2), region(3) and region(4), respectively. The value of the corresponding search range (SR) is determined according to the four regions. For example, each interval range is SR/4, which is adjusted according to the distribution.

Take initial search range ($SR_{initial}$) to be thirty-two as an example for explanation, region(1), region(2), region(3) and region(4) are used for gathering disparity vector distribution. The location interval ranges of the absolute value of horizontal disparity vector (DV_X) distribution or the vertical disparity vector (DV_Y) are 0-7, 8-15, 16-23 and 24-31. The counter values of the distribution are counter_1, counter_2, counter_3 and counter_4.

Figure 6C:
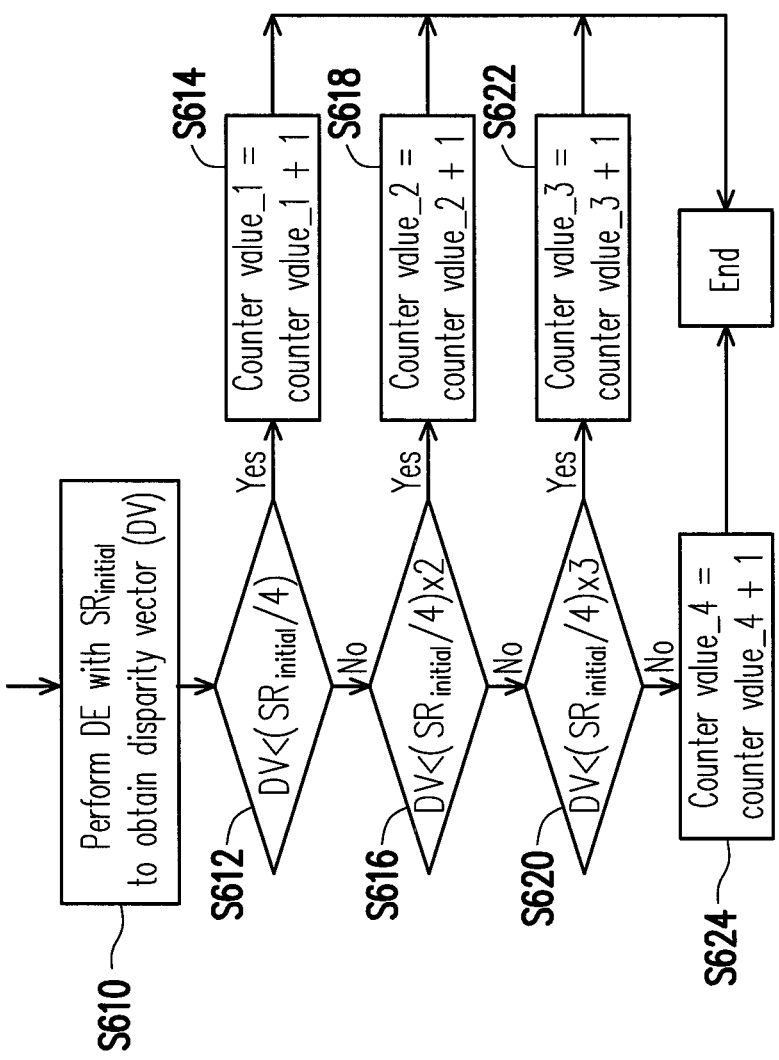

FIG. 6C is a flow chart that illustrates performing distribution calculation after performing DE to all the macroblocks (MB) in the first P frame (frame 602 in FIG. 6A). In step S610, the disparity vector of all the macroblocks is obtained by performing disparity estimation with the initial search range ($SR_{initial}$) to all the macroblocks in a first P frame. Then, according to step S612, determine whether the disparity vector is smaller than ¼ of the initial search range ($SR_{initial}$); if affirmative, increase the value of the counter_1 by one as in step S614, and end this distribution calculation process; if negative, execute the next step. In step S616, determine whether the disparity vector is smaller than 2/4 of the initial search range ($SR_{initial}$); if affirmative, increase the value of the counter_2 by one as in step S618, and end this distribution calculation process; if negative, execute the next step. In step S620, determine whether the disparity vector is smaller than ¾ of the initial search range ($SR_{initial}$), if affirmative, increase the value of the counter_3 by one, and end this distribution calculation process; if negative, increase the value of the counter_4 by one, and end this distribution calculation process.

Figure 6D:
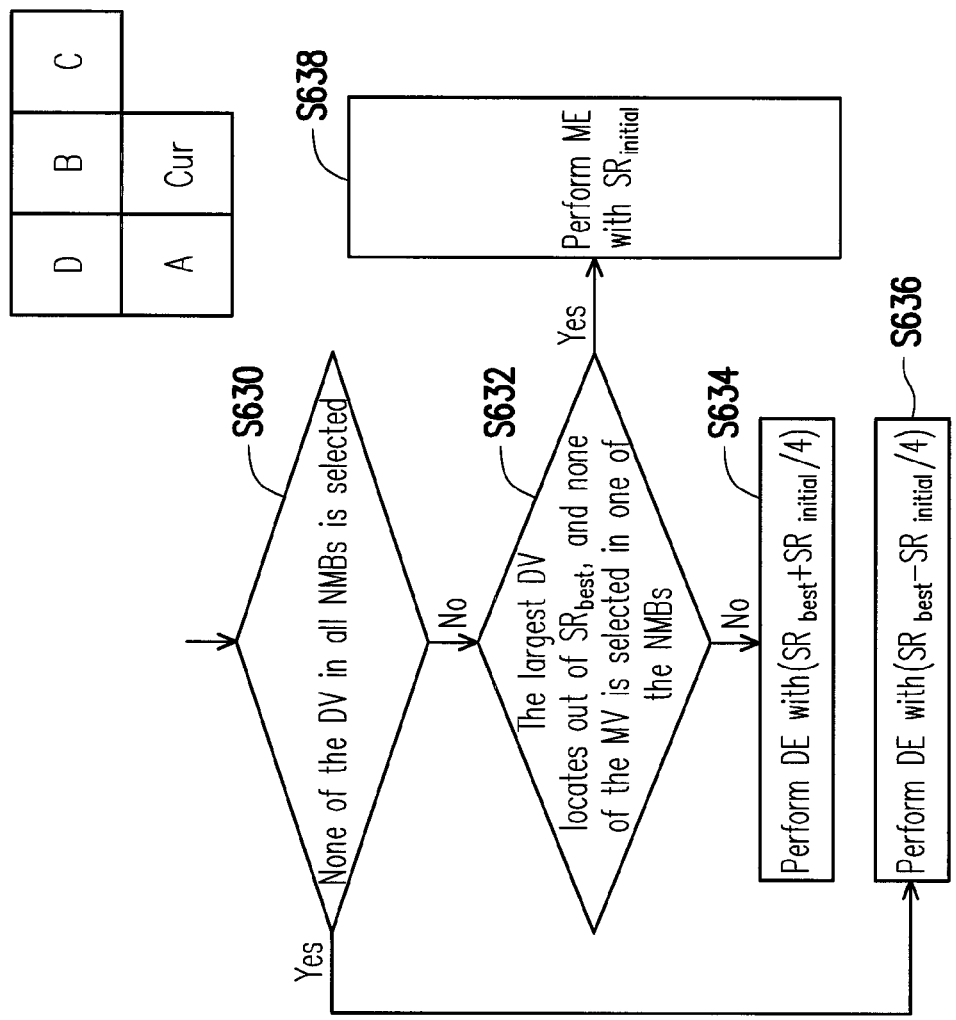

FIG. 6D is a flow chart illustrating the search range determination for performing DE to the macroblock not in the first frame in an embodiment. In one embodiment, regarding the neighboring macroblock (NMB) of the macroblock (MB) currently being handled, the index "Cur" represents the macroblock currently being handled. The macroblock of index "A", "B", "C" and "D" may represent the neighboring macroblock.

When performing DE to a macroblock, the search range can be selected from three candidate search ranges, including the best search range ($SR_{best}$) according to the aforementioned embodiments plus or minus $SR_{initial}/4$, or the expanded search range of the initial search range ($SR_{initial}$). The embodiment in FIG. 6D explains such selection process.

Generally, the selected search range is the best search range ($SR_{best}$) plus interval range $SR_{initial}/4$, i.e., (SR=$SR_{best}$+$SR_{initial}/4$).

However, if it is determined that the macroblock (MB) being handled has large-disparity characteristic according to the neighboring macroblock (NMB) information, to avoid missing the correct disparity vector and increasing the bit rate, the aforementioned large-disparity characteristic of the neighboring macroblock (NMB) being handled must be included when selecting the search range. In addition, according to experimental statistics, the percentage of the macroblock that selects DV are substantially smaller than 10% of the macroblocks of all the frames, and accordingly should be taken into consideration when selecting search range.

In one of the embodiments of the disclosure, the following two formulas are provided for selecting the (SR=$SR_{best}$+$SR_{initial}/4$), (SR=$SR_{best}$−$SR_{initial}/4$) or the initial search range ($SR_{initial}$) to perform DE to the macroblock. It is to be noted that the formula is not limited herein.

Referring to FIG. 6D, step S630 provides to determine whether none of the disparity vector (DV) of the neighboring macroblock (NMB) is selected; if affirmative, select (SR=$SR_{best}$−$SR_{initial}/4$) to perform DE to the macroblock; if negative, execute step S632.

In step S632, determine whether the largest disparity vector (DV) locates out of (SR=$SR_{best}$), and whether none of the neighboring block (NMB) selects motion vector (MV); if affirmative, select the initial search range ($SR_{initial}$) to perform DE to the macroblock; if negative, execute step S634 to select (SR=$SR_{best}$+$SR_{initial}/4$) to perform DE to the macroblock.

Figure 7:
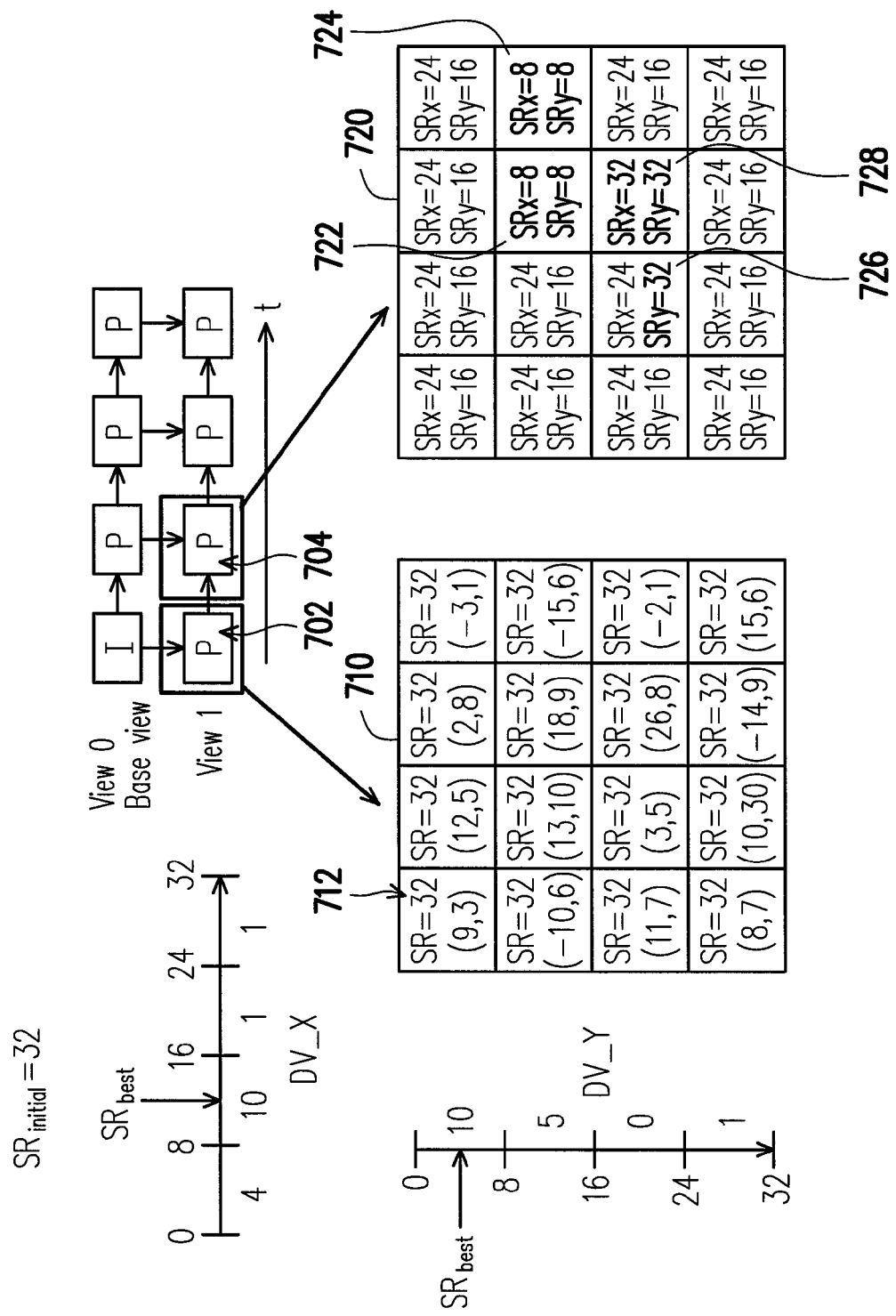
FIG. 7 is a schematic view of the adaptive search range method for disparity estimation (DE) disclosed in an exemplary embodiment of the disclosure.

FIG. 7 is a schematic view of the adaptive search range method for DE disclosed in an exemplary embodiment of the disclosure. Here, the initial search range ($SR_{initial}$) is set at thirty-two as an example for explanation.

For the first P frame (702), perform DE with the initial search range ($SR_{initial}$) to the all macroblocks (MB). Here, all the macroblocks (MB) use SR=32 and obtain horizontal disparity vector (DV_X) distribution and vertical disparity vector (DV_Y) distribution.

Perform DE with initial search range ($SR_{initial}$) to each macroblock. Whenever the DE of a macroblock is completed, the absolute value of the disparity vector is obtained and the interval range of disparity vector distribution of such disparity vector is recorded. For example, after completing the DE of the macroblock 712, (DV_X, DV_Y)=(9, 3) is obtained. Because DV_X=9 is larger than seven and smaller than fifteen, the DV_X locates in the second region, and therefore one is added to the corresponding counter value. Referring to FIG. 7, after performing DE with initial search range (SR=32) to the first frame, the $SR_{best}$(DV_X) obtained is between eight and fifteen, and the $SR_{best}$(DV_Y) is between zero and seven.

For the follow-up macroblock, for example, the second P frame (704) in FIG. 7, the search range (SR) uses the best search range ($SR_{best}$) of the first P frame (702) plus interval range $SR_{initial}/4$, i.e., SR=$SR_{best}$+$SR_{initial}/4$.

In specific circumstances, SR=$SR_{best}$−$SR_{initial}/4$ may be selected as search range, such as the macroblocks indexed 722 and 724 in FIG. 7. On the other hand, the search range may be expanded to the initial search range ($SR_{initial}$), such as the macroblocks indexed 726 and 728 in FIG. 7. That is, because the macroblocks 726 and 728 has large-disparity characteristic, the search range will be expanded to the initial search range (SR=32).

Although the invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An adaptive search range method for motion estimation adapted to multiview video coding, the adaptive search range method comprising:
    performing a motion estimation flow for a plurality of first blocks in a first frame obtained from a first view according to an initial search range as a first search range to obtain a motion vector distribution, and finding a first candidate search range according to the motion vector distribution; and
    selecting the first candidate search range or the initial search range as a second search range for performing the motion estimation flow for a plurality of second blocks in a second frame to find and provide a motion vector of the plurality of the second blocks to the second frame for video coding, wherein the second frame is from a second view,
    wherein the step of finding the first candidate search range comprises:
    dividing the initial search range into a plurality of regions, wherein each region corresponds to a counter value;
    analyzing each of the first blocks for increasing the counter value corresponding to the region of the regions which be located by the motion vector of one of the plurality of first blocks;
    finding a best search range from one of the regions which is corresponding to the highest counter value according to the motion vector distribution, after completing analyzing the first blocks; and
    calculating the first candidate search range according to the best search range, the initial search range and the number of the plurality of regions.

2. The adaptive search range method according to claim 1, wherein the step of calculating a first candidate search range comprises:
    setting the first candidate search range as a sum of the best search range plus the quotient of dividing the initial search range by the number of the plurality of regions.

3. The adaptive search range method according to claim 1, wherein the second search range is selected from the first candidate search range and the initial search range, wherein selecting the initial search range as the second search range comprises:
    obtaining a neighboring block information according to a plurality of neighboring blocks of the second block; and
    analyzing whether the second block conforms to a motion characteristic judgment method according to the neighboring block information, and
    if affirmative, the second search range selects the initial search range as the second search range, and
    if negative, the second search range selects the first candidate search range.

4. The adaptive search range method according to claim 3, wherein analyzing whether the second block conforms to a motion characteristic judgment method according to the neighboring block information comprises:
    analyzing whether a rate-distortion cost of each of the neighboring blocks neighboring to the second block is higher than a magnitude of an average rate-distortion cost of the plurality of first blocks of the first frame, wherein the magnitude is larger than one, and
    if affirmative, the second search range selects the initial search range as the second search range, and
    if negative, the second search range selects the first candidate search range.

5. The adaptive search range method according to claim 3, wherein analyzing whether the second block conforms to a motion characteristic judgment method according to the neighboring block information comprises:
    analyzing whether a maximum value of the motion vectors of the neighboring blocks locates between the best search range and the first candidate search range and none of the neighboring blocks selects a disparity vector, and
    if affirmative, the second search range selects the initial search range as the second search range, and
    if negative, the second search range selects the first candidate search range.

6. The adaptive search range method according to claim 3, wherein analyzing whether the second block conforms to the motion characteristic judgment method according to the neighboring block information comprises:
    analyzing whether a maximum value of the motion vector of the neighboring blocks exceeds the first candidate search range, and
    if affirmative, the second search range selects the initial search range as the second search range, and
    if negative, the second search range selects the first candidate search range.

7. An adaptive search range method for disparity estimation adapted to multiview video coding, the adaptive search range method comprising:
    performing a disparity estimation flow for a plurality of first blocks in a first frame according to an initial search range as a first search range to obtain a disparity vector distribution, and finding a first candidate search range and a second candidate search range according to the disparity vector distribution, wherein the first frame is obtained at a first time; and selecting the first candidate search range or the second candidate search range as a second search range for performing the disparity estimation flow for a plurality of second blocks in a second frame to obtain and provide a disparity vector corresponding to the disparity estimation flow for video coding, wherein the second frame is obtained at a second time and the first time is earlier than the second time, wherein the step of finding the first candidate search range and the second candidate search range comprises:

dividing the initial search range into a plurality of regions, wherein each region corresponds to a counter value;

analyzing each of the first blocks for increasing the counter value corresponding to the region of the regions which be located by the disparity vector of one of the plurality of first blocks;

finding a best search range from one of the regions which is corresponding to the highest counter value according to the disparity vector distribution, after completing analyzing the first blocks; and calculating the first candidate search range and the second search range according to the best search range, the initial search range and the number of the plurality of regions.

8. The adaptive search range method according to claim 7, wherein the step of calculating the first candidate search range and the second candidate search range comprises:

setting the first candidate search range as a sum of the best search range plus the quotient of dividing the initial search range by the number of the plurality of regions; and setting the second candidate search range as a difference of the best search range subtracting the quotient of dividing the initial search range by the number of the plurality of regions.

9. The adaptive search range method according to claim 7, wherein the second search range being selected from the first candidate search range, the second candidate search range or the initial search range, comprises:

obtaining a neighboring block information according to a plurality of neighboring blocks of the second block; and analyzing whether the second block conforms to a disparity characteristic judgment method according to the neighboring block information, and if affirmative, the second search range selects the initial search range as the second search range, and if negative, the second search range selects either the first candidate search range or the second candidate search range.

10. The adaptive search range method according to claim 9, wherein analyzing whether the second block conforms to the disparity characteristic judgment method according to the neighboring block information comprises:

analyzing whether none the disparity vector of the neighboring blocks is selected, and if affirmative, the second search range selects the second candidate search range; and analyzing whether the disparity vector of the neighboring blocks locates outside a best search range, and whether none of the motion vector of the neighboring blocks is selected, and if both are affirmative, the second search range selects the initial search range, and if either is negative, the second search range selects the first candidate search range.

* * * * *